United States Patent
Blyth

(10) Patent No.: US 6,347,942 B1
(45) Date of Patent: Feb. 19, 2002

(54) EARLY INVOLVEMENT METHOD FOR PREPARING ELEMENTARY SCHOOL STUDENTS FOR SECONDARY SCHOOL

(76) Inventor: Donald J. Blyth, 9956 S. Leavitt St., Chicago, IL (US) 60643

( * ) Notice: Subject to any disclaimer, the term of this patent is extended or adjusted under 35 U.S.C. 154(b) by 0 days.

(21) Appl. No.: 09/222,523

(22) Filed: Dec. 29, 1998

(51) Int. Cl.[7] ........................... G09B 19/00; G06F 17/00
(52) U.S. Cl. ....................................... 434/107; 705/500
(58) Field of Search ................ 705/9, 500; 364/710.04; 434/107

(56) References Cited

PUBLICATIONS

Database search (EAST); Abstracts from Clearinghouse, Jul. 10, 2000.*

* cited by examiner

Primary Examiner—John A. Ricci
(74) Attorney, Agent, or Firm—Emrich & Dithmar

(57) ABSTRACT

Elementary school students are introduced to secondary school in an early involvement program by enrolling in a secondary school class which meets before or after elementary school classes and which are taught by a secondary school instructor. The early involvement program is announced to prospective enrollees and their parents. Sign-up information is provided by the contributing elementary school. Early involvement students are identified and enrolled by the guidance and home room teachers. A written agreement to participate is signed by each student and his parents as well as by the home room teacher and contributing elementary and cooperating secondary school principals. Participating student effort and progress is monitored by the cooperating secondary school. A progress report is issued at high school term intervals for each student. No record of a student drop-out or failure is maintained and no penalty for non-attendance or non-achievement is imposed. Advanced standing credit toward secondary school classes is granted for those who successfully complete the early involvement program, with such credit posted in the records of the successful students upon secondary school enrollment. In the alternative, remedial high school credit for a prior elementary school failure may be granted to successful students where the participating students are evaluated using secondary school performance criteria for any remedial high school subject taken.

6 Claims, 2 Drawing Sheets

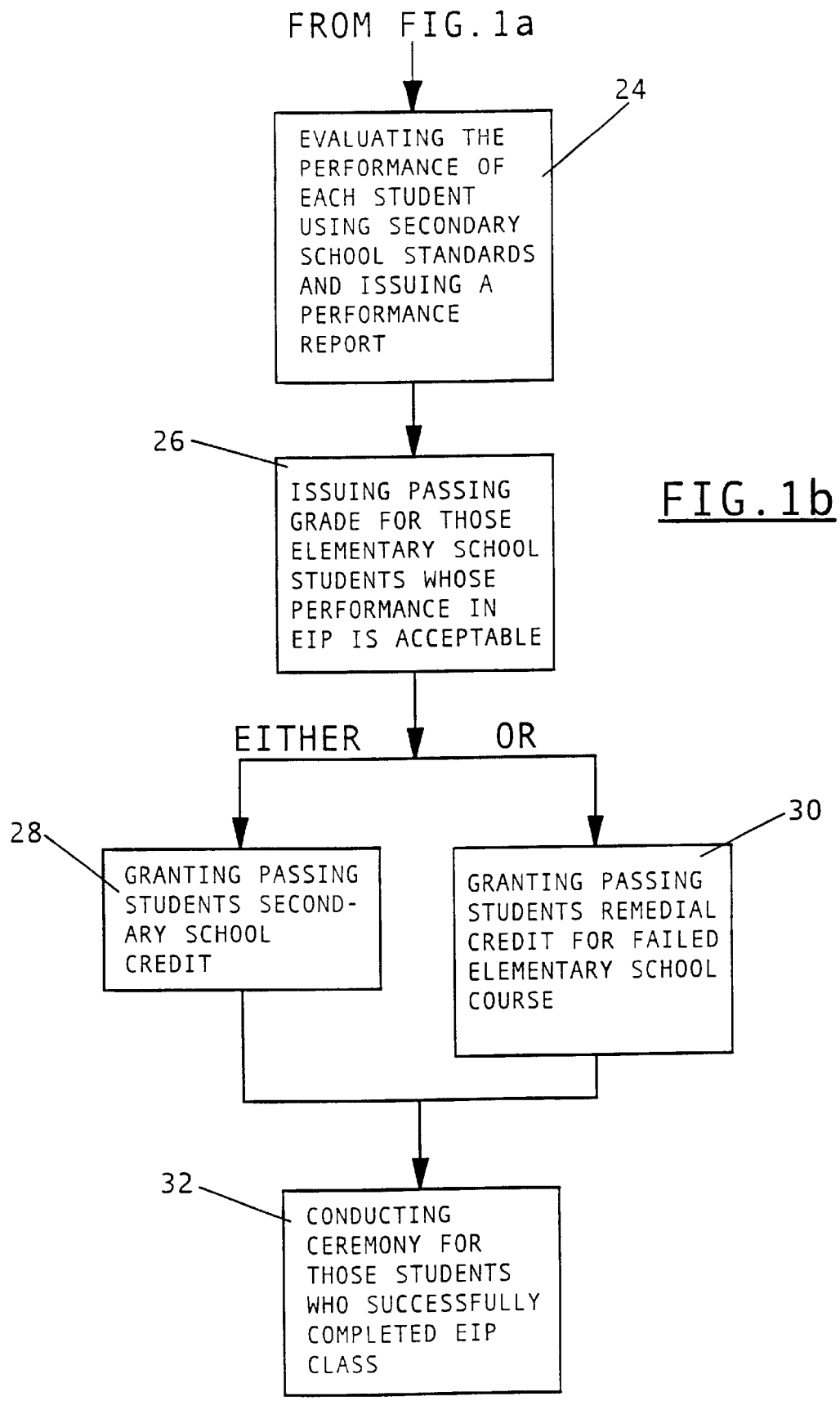

EARLY INVOLVEMENT METHOD FOR PREPARING ELEMENTARY SCHOOL STUDENTS FOR SECONDARY SCHOOL

FIELD OF THE INVENTION

This invention relates directly to the education of elementary school students and is an early involvement program for introducing elementary school students to secondary school courses on a voluntary basis without the risk of penalty for dropping out or subject failure. The name of the invention is Early Involvement.

BACKGROUND OF THE INVENTION

Many students find the transition from elementary school to secondary school difficult and anxiety—filled. Many student apprehensions arise from the social situation, such as new teachers, new friends and less supervision, while other apprehensions are centered on academics and class work. Such latter apprehensions are well-founded if the student is not prepared for the rigors of secondary school-level courses. The present invention is intended to relieve the trepidation which some elementary school students may have about entering secondary school, and to substantially increase the likelihood that the student will be successful at the secondary school level. A student successful in the Early Involvement method may gain accelerated placement in high school and high school drop-out insurance.

OBJECTS AND SUMMARY OF THE INVENTION

Accordingly, it is an object of the present invention to provide for the early involvement of elementary school students in secondary school classes on a voluntary basis without the risk of failure or penalty in the event of unsuccessful completion of the class.

It is another object of the present invention to provide a cooperative program between elementary and secondary schools and the parents of elementary school students to afford the students with an early experience of and exposure to secondary school classes on a voluntary basis.

Yet another object of the present invention is to provide an early secondary school involvement program for successful elementary school students which allows for the granting of advanced standing for successful secondary school classes or enrollment in regular level subjects rather then remedial level subjects upon high in school entry.

This invention contemplates a method for preparing elementary school students for secondary school comprising the steps of providing notice to elementary school students and their parents of an early involvement program for elementary school students; identifying students in the elementary school class who indicate a strong interest in the early involvement program; enrolling the student in a secondary school class taught by a secondary school instructor before or after elementary school classes; evaluating each student's performance in the early involvement program using secondary school performance criteria; issuing a report on each student's performance; and granting secondary school credit or remedial secondary school credit to those students who successfully complete the early involvement program, while not reporting or recording any failure to successfully complete the early involvement program on a student's record.

BRIEF DESCRIPTION OF THE DRAWING

The appended claims set forth those novel features which characterize the invention. However, the invention itself, as well as further objects and advantages thereof will best be understood by reference to the following detailed description of a preferred embodiment taken in conjunction with the accompanying drawing, which includes FIGS. 1a and 1b showing a simplified flowchart illustrating the series of steps involved in carrying out the method of the present invention for preparing elementary school students for secondary school.

DETAILED DESCRIPTION OF THE PREFERRED EMBODIMENT

Figure 1A:
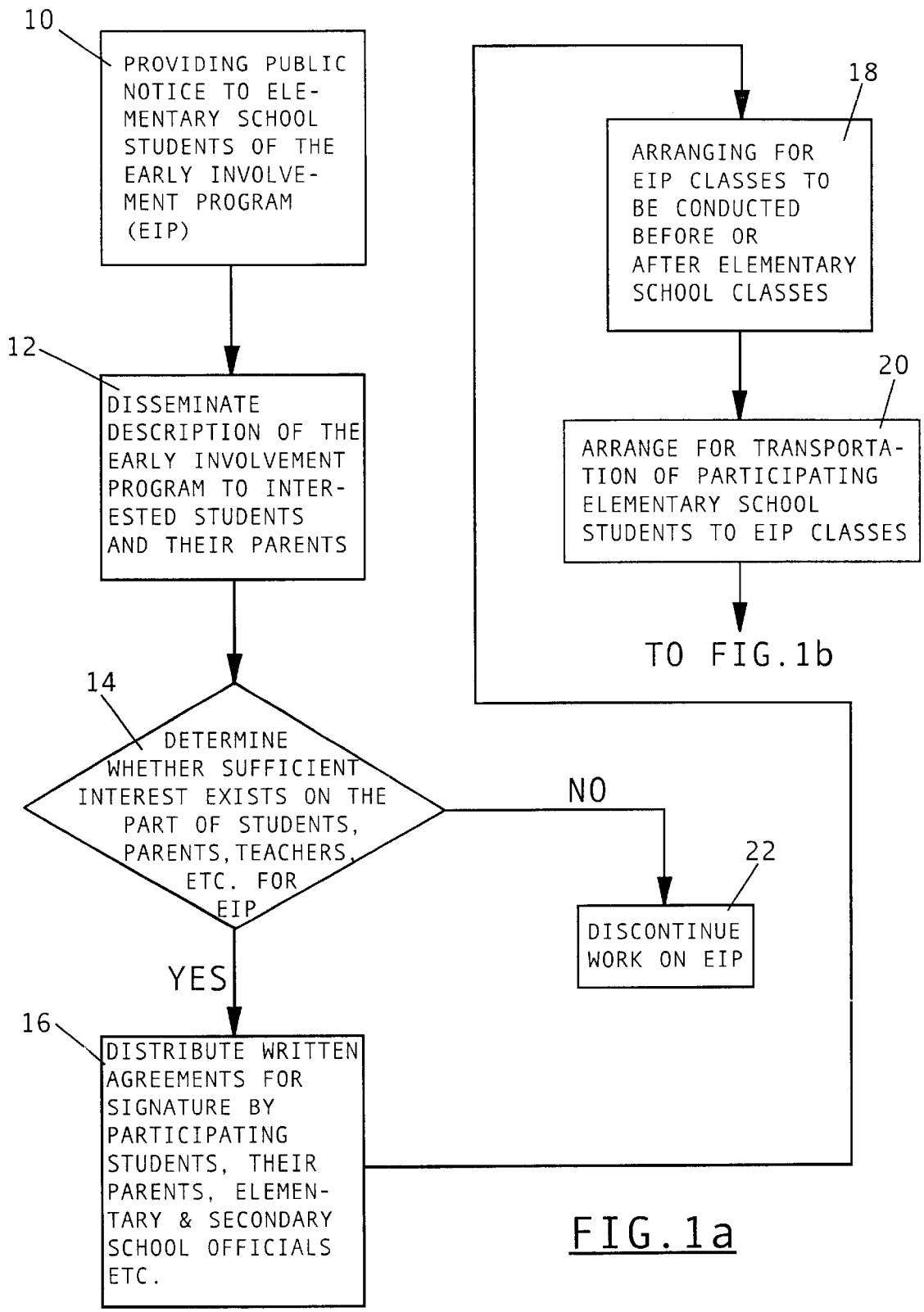

This invention is directed to a cooperative elementary-secondary school educational program for use in public, private and/or church-related schools for preparing elementary school students for the secondary school academic curriculum. The invention will now be described in detail with reference to FIGS. 1a and 1b wherein are shown a simplified flowchart illustrating the series of steps involved in carrying out the method of the present invention for introducing elementary students to and preparing elementary students for secondary school. In this drawing, a rectangular symbol indicates the carrying out of a task, while a diamond symbol indicates a decision point.

The early involvement program brings motivated students in sixth, seventh or eighth grade to the local secondary school to attend a secondary school class in a given subject five days per week. The class may meet either before elementary school classes begin or after the last elementary school class. Elementary school classes often begin later than and end earlier than secondary school classes. For example, the first period in secondary school may meet typically between 8:00 a.m. and 8:45 a.m., while elementary school classes frequently begin at 9:00 a.m. An elementary school student enrolled in the early involvement program would attend an 8:00 a.m. secondary school class or a p.m. high school class which convenes after elementary school classes are let out. A secondary school class attended by elementary school students would have to end a sufficient time before the beginning of the first elementary school class to permit participating students to return to their elementary school for the beginning of classes. Similarly, an afternoon secondary school class attended by participating elementary school students would have to begin in sufficient time after the completion of elementary school classes to permit the participating students to travel to the local secondary school. Typical secondary school classes which could be used in this early involvement program include Beginner Band, Spanish I, or Algebra I. Cooperation between contributing elementary schools (or their common school district) and a contributing secondary school (or secondary school district) is required for a successful early involvement program. Motivation to participate in the early involvement program is an imperative for the student and his or her parents to ensure regular attendance and good study habits for successful completion of the program.

Prior to initiation of the early involvement program, a cooperative written agreement is entered into by administrative officers and local school councils or school boards. In this written agreement, the administrators of local schools or school boards involved with the early involvement program agree to the terms of the program and pledge their support and cooperation for the successful implementation of the program. The early involvement program would be the subject of public announcements by both the contributing elementary and secondary schools, or school boards. Local media such as newspapers, radio and television may be used to inform the public of the early involvement program and to explain the details of the program.

Prior to implementation of the early involvement program, public announcements directed to the prospective students and their parents are made in a timely manner via school bulletins and pamphlets distributed by the contributing elementary schools as shown at step 10 in FIG. 1*a*. These announcements should be timely made, preferably by the January preceding the September initiation of the program. Following the initial announcements regarding the early involvement program, the cooperating schools, both elementary and secondary, prepare preliminary information for the parents of prospective students as well as by the involved school staffs. This information would be disseminated via school bulletins and pamphlets to elementary school students as well as by appropriate notice to the involved elementary and secondary school staff members (step 12). Later, in May and June such as at parent days, these information bulletins and pamphlets are again distributed and discussion groups of the parents of interested elementary students are organized. At this point, local school councils and parents groups would approve of the implementation of the early involvement program for the upcoming school year (step 14). If such approval is not forthcoming, planning for the early involvement program should be terminated (step 22). If school councils and parent groups approve of the program, the early involvement program is adopted in writing by the appropriate school boards.

In June, early involvement program information and sign-up forms are sent to the homes of interested students by the contributing elementary school. The requirement for parent/child motivation in the early involvement program should be emphasized in the distributed materials as well as the commitment to regularly attend the scheduled classes for the success of the early involvement program. Classes for four or five different secondary school subjects should preferably be offered, with preregistration of elementary school students in the early involvement program carried on concurrently with secondary school enrollment and registration. Subject selection must be accompanied by sign-offs from the guidance staff and by the sending/receiving principals.

The sharing of student enrollment and progress information in the early involvement program between contributing elementary schools and a receiving secondary school should be ongoing. In the event of closing of an early involvement subject class at the secondary school, guidance counselor staff should renegotiate the early involvement student enrollment for an acceptable alternative class for the interested elementary school student. The early involvement program begins the first day of secondary school classes and continues for the high school term, five days a week.

All early involvement program participation by elementary school students is voluntary. No penalties of any kind accrue for any non-attendance, insufficient or lapsed effort, or non-achievement of a participating elementary school student. No record of aborted or unsuccessful early involvement program enrollment is to be maintained in school permanent records. No permanent record of the failure of an elementary school student to complete a secondary school class in the early involvement program is to be made or kept.

The motivation and cooperation of the parents of elementary school students participating in the early involvement program, and continuing throughout the entire school year, is essential for continued student participation, regular attendance, the monitoring of student effort, and the completion of assigned homework. The students are taught by a secondary school instructor who applies secondary school performance criteria in evaluating the participating elementary school students.

A simple voluntary written contract, containing no sanctions for the student for non-performance, is to be used at the sign-up for the early involvement program (step 16). Each student and at least one of his or her parents should sign the contract stating a commitment to regular class attendance and conscientious and continuing study habits. Contributing elementary school principals and home room teachers of the participating elementary school students, by signing the contract, indicate a willingness to cooperate in ensuring student attendance at the secondary school courses in the early involvement program and to make any adjustments necessary in student schedules to ensure such attendance.

Examples of early involvement program schedules of elementary school students participating in morning classes are given by the following (step 18), 1. 7th Grade: Jane Doe
    7:45 A.M.–8:00 A.M. Travel to secondary school
    8:00 A.M.–8:45 A.M. Spanish I (1st period)
    8:50 A.M.–9:05 A.M. Travel to elementary school
    9:05 A.M.–3:15 P.M. Seventh Grade program
    Guidance values: Enrichment and advanced standing
2. 6th Grade: John Doe
    7:45 A.M.–8:00 A.M. Travel
    8:00 A.M.–8:45 A.M. Band I (1st period)
    8:50 A.M.–9:05 A.M. Travel to elementary school
    9:05 A.M.–3:15 P.M. Sixth Grade program
    Guidance values: Enrichment and advanced standing
3. 8th Grade: William Doe
    7:45 A.M.–8:00 A.M. Travel
    8:00 A.M.–8:45 A.M. Algebra I
    8:50 A.M.–9:05 A.M. Travel
    9:05 A.M.–3:15 P.O. Eighth Grade program
    Guidance values: Acceleration and advanced standing
4. 8th Grade: Catherine Doe
    7:45 A.M.–8:00 A.M. Travel to secondary school
    8:00 A.M.–8:45 A.M. Remedial Math (1st period)
    8:50 A.M.–9:05 A.M. Travel to elementary school
    9:05 A.M.–3:15 P.M. Eighth Grade program
    Guidance value: Graduation at beginning 9th grade level in math to establish readiness and eligibility for Algebra I.

Travel times and school schedules may require adjustment for the beginning of the elementary school day for students participating in the early involvement program.

An example of an afternoon schedule for an elementary school student participating in the early involvement program is given by the following:

1. 8th Grade: Donald Doe
    9:00 A.M.–3:15 P.M. 8th grade program
    3:15 P.M.–3:30 P.M. Travel to secondary school
    3:30 P.M.–4:15 P.M. Band I
    4:15 P.M.–4:30 P.M. Travel home This latter afternoon option would be available only in secondary schools operating on an extended day, perhaps because of high enrollment. Travel, in the afternoon option, might be furnished, of necessity, by the parents of the participating elementary school students (step 20). The regular school bus service is a more desirable alternative.

In all courses taken by elementary school students participating in the early involvement program, regular secondary school performance standards and grading are used by the secondary school teacher conducting the course (step 24). Testing and progress reports are provided on secondary school report cards designated "Early Involvement" (step 26). Parents of participating elementary school students must be notified immediately by telephone or other form of expeditious communication of poor student attendance. Elementary school students who successfully complete and pass a secondary school course offered in the early involvement program will be credited with either advanced standing placement upon entering secondary school (step 28) or will be afforded remedial credit for previously taken, failed elementary school courses (step 30). The benefits for elementary school students who successfully complete a remedial secondary school course in the early involvement program may thus include qualifying for: 1. a regular ninth grade course for which the student's elementary record did not qualify, or for: 2. remedial credit for a failed elementary school course. Provided the secondary school accrediting agency does not object, earned early involvement program Carnegie units of credit are posted in successfully participating student records upon secondary school enrollment. Elementary school students who successfully complete a secondary school course in the early involvement program should be duly recognized upon the completion of classes by a special meeting or other recognition ceremony with an appropriate civic leader or education official as the guest speaker (step 32).

There has thus been shown a method for introducing elementary school students to and preparing elementary school students for secondary school by enrolling the elementary school student in a secondary school class which meets before or after elementary school classes. The early involvement secondary school introduction and preparation program is announced to prospective enrollees and program and sign-up information is provided by the contributing elementary schools. A written agreement to participate is signed by each student and his or her parents as well as by the participating elementary and secondary schools, including the student's principal and homeroom teacher. This becomes an informal contract. Participating student effort and progress is monitored by the secondary school instructor conducting the class and reports are issued at the end of the program term for each student. Each student is evaluated using secondary school performance criteria. A record of early involvement student drop-out or failure is not maintained and no penalty accrues for non-attendance or non-achievement by a participating student. Advanced standing credit for secondary school classes or remedial credit for failed elementary school classes may be granted for those who successfully complete the early involvement program, with such credit posted in the records of successful students upon secondary school enrollment.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A method for preparing elementary school students for secondary school comprising the steps of:

providing notice to elementary school students and parents of said elementary school students of an early involvement program for elementary school students, wherein said early involvement program includes enrollment in a secondary school class taught by a secondary school instructor before or after elementary school classes;

identifying students in the elementary school class who indicate a strong interest in the early involvement program;

enrolling elementary school students in said secondary school class taught by said secondary school instructor before or after elementary school classes;

evaluating each elementary school student's performance in the early involvement program using secondary school performance criteria and issuing a report on the elementary school student's performance;

granting regular secondary school credit or remedial secondary school credit to those elementary school students who successfully complete the early involvement program, while not reporting or recording a failure to successfully complete the early involvement program on an elementary school student's record; and preparing a written agreement between cooperating elementary and secondary schools and having said written agreement executed by officials and school boards of said cooperating elementary and secondary schools.

2. The method of claim 1 further comprising the step of arranging for transportation for elementary school students enrolled in the early involvement program to a contributing secondary school before or after said elementary school classes, and return to a student's elementary school.

3. The method of claim 1 further comprising the step of convening a meeting of elementary school students interested in the early involvement program and parents of said elementary school students as well as representatives of contributing and secondary schools after providing notice of the early involvement program to the elementary school students.

4. The method of claim 1 further comprising the step of preparing and distributing a written agreement for execution by each participating elementary school student, at least one parent of each participating elementary school student, and representatives of cooperating elementary and secondary schools.

5. The method of claim 1 further comprising the step of arranging for classes in said early involvement program to be conducted before or after the regular elementary school class hours for the entire school year.

6. The method of claim 1 further comprising the step of arranging for a recognition event following completion of the early involvement program for those elementary school students who successfully complete the early involvement program.

* * * * *

US006347942C1

(12) EX PARTE REEXAMINATION CERTIFICATE (5107th)
United States Patent
Blyth

(10) Number: US 6,347,942 C1
(45) Certificate Issued: May 3, 2005

(54) EARLY INVOLVEMENT METHOD FOR PREPARING ELEMENTARY SCHOOL STUDENTS FOR SECONDARY SCHOOL

(75) Inventor: Donald J. Blyth, 9956 S. Leavitt St., Chicago, IL (US) 60643

(73) Assignee: Donald J. Blyth, Chicago, IL (US)

Reexamination Request:
No. 90/006,531, Feb. 10, 2003

Reexamination Certificate for:
Patent No.: 6,347,942
Issued: Feb. 19, 2002
Appl. No.: 09/222,523
Filed: Dec. 29, 1998

(51) Int. Cl.[7] .......................... G09B 19/00; G06F 17/00
(52) U.S. Cl. ....................................... 434/107; 705/500
(58) Field of Search ............................. 705/9, 12, 500; 434/107, 219

(56) References Cited

PUBLICATIONS

Graduation Requirements for Students in Missouri's Public Schools; Guidelines forPrincipals, Counselors, and Other School Personnel (Apr. 1997).*

Policy Guidelines for the Delivery and Transferability of Credit Obtained in Dual Credit Programs Offered in High Schools with Clarifying Comments (Jun. 1999).*

Giftedness and Egalitarianism: A Zero Sum? (Feb. 1998) NASSP Bulletin (INSP), v. 82, No. 595, pp. 47–60.*

* cited by examiner

Primary Examiner—Jacob K. Ackun, Jr.

(57) ABSTRACT

Elementary school students are introduced to secondary school in an early involvement program by enrolling in a secondary school class which meets before or after elementary school classes and which are taught by a secondary school instructor. The early involvement program is announced to prospective enrollees and their parents. Sign-up information is provided by the contributing elementary school. Early involvement students are identified and enrolled by the guidance and home room teachers. A written agreement to participate is signed by each student and his parents as well as by the home room teacher and contributing elementary and cooperating secondary school principals. Participating student effort and progress is monitored by the cooperating secondary school. A progress report is issued at high school term intervals for each student. No record of a student drop-out or failure is maintained and no penalty for non-attendance or non-achievement is imposed. Advanced standing credit toward secondary school classes is granted for those who successfully complete the early involvement program, with such credit posted in the records of the successful students upon secondary school enrollment. In the alternative, remedial high school credit for a prior elementary school failure may be granted to successful students where the participating students are evaluated using secondary school performance criteria for any remedial high school subject taken.

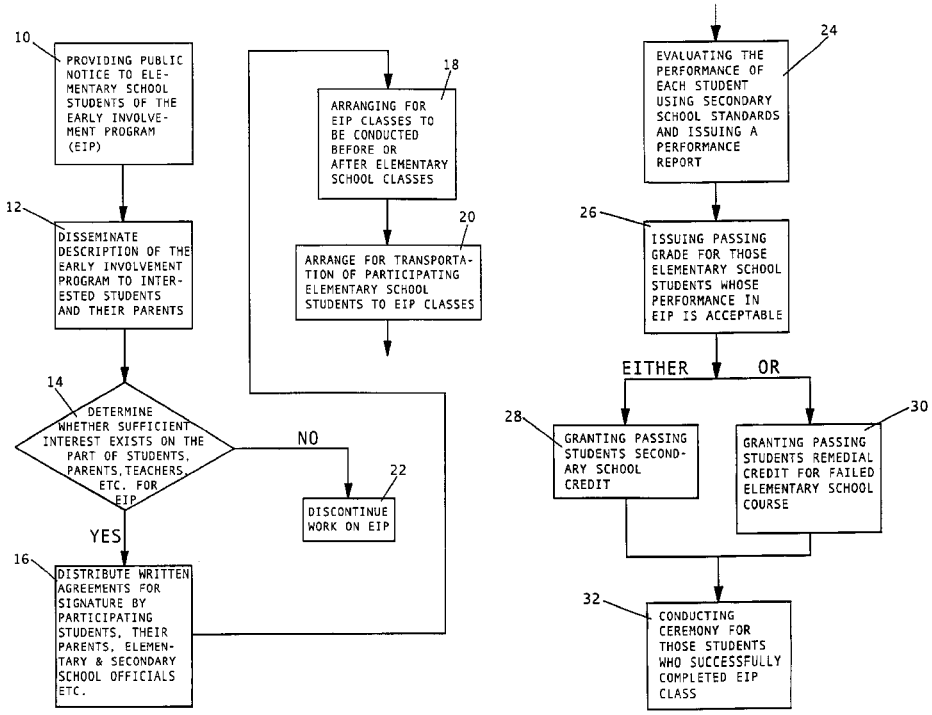

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4 and 6 are cancelled.

Claims 1 and 3 are determined to be patentable as amended.

Claims 2 and 5, dependent on an amended claim, are determined to be patentable.

1. A method for preparing elementary school students for secondary school comprising the steps of:
   providing notice to elementary school students and parents of said elementary school students of an early involvement program for elementary school students, wherein said early involvement program includes enrollment in a secondary school class taught by a secondary school instructor before or after elementary school classes;
   identifying students in the elementary school class who indicate a strong interest in the early involvement program;
   enrolling elementary school students in said secondary school class taught by said secondary school instructor before or after elementary school classes;
   evaluating each elementary school student's performance in the early involvement program using secondary school performance criteria and issuing a report on the elementary school student's performance;
   granting regular secondary school credit [or. remedial secondary school credit] to those elementary school students who successfully complete the early involvement program, while not reporting or recording a failure to successfully complete the early involvement program on an elementary school student's record; [and]
   preparing a written agreement between cooperating elementary and secondary schools and having said written agreement executed by officials and school boards of said cooperating elementary and secondary schools;
   *preparing and distributing a written agreement for execution by each participating elementary school student, at least one parent of each participating elementary school student, and representatives of cooperating elementary and secondary schools; and*
   *arranging for a recognition event following completion of the early involvement program for those elementary school students who successfully complete the early involvement program.*

3. The method of claim 1 further comprising the step of convening a meeting of elementary school students interested in the early involvement program and parents of said elementary school students as well as representatives of contributing [and] secondary schools after providing notice of the early involvement program to the elementary school students.

* * * * *